United States Patent [19]

Rodriguez-Cavazos et al.

[11] Patent Number: 5,335,024
[45] Date of Patent: Aug. 2, 1994

[54] AUTOMATIC KINESCOPE BIAS ARRANGEMENT

[75] Inventors: Enrique Rodriguez-Cavazos, Indianapolis; Robert D. Altmanshofer, Carmel, both of Ind.

[73] Assignee: Thomson Consumer Electronics, Inc., Indianapolis, Ind.

[21] Appl. No.: 973,812

[22] Filed: Nov. 9, 1992

[30] Foreign Application Priority Data

Nov. 13, 1991 [GB] United Kingdom ............... 9124071

[51] Int. Cl.⁵ .......................................... H04N 5/68
[52] U.S. Cl. ............................................ 348/806
[58] Field of Search ............... 358/242, 243, 139, 64, 358/11, 10; 315/384; H04N 5/68

[56] References Cited

U.S. PATENT DOCUMENTS

| | | | |
|---|---|---|---|
| 4,051,521 | 9/1977 | Harwood | 358/30 |
| 4,237,479 | 12/1980 | Lavigne | 358/33 |
| 4,356,508 | 10/1982 | Okada | 358/29 |
| 4,463,385 | 7/1984 | Parker | 358/242 |
| 4,484,226 | 10/1984 | Parker | 358/242 |
| 4,484,229 | 10/1984 | Parker | 358/243 |
| 4,633,321 | 12/1986 | Tallant, II | 358/243 |

FOREIGN PATENT DOCUMENTS 0064757 11/1982 European Pat. Off. ...... H04N 9/535

OTHER PUBLICATIONS

The TDA3562A by Joseph Cieszynski, Television Oct. 1987 pp. 834–835.
An Automatic Kinescope Biasing System, by J. C. Tallent, II, et al. IEEE Transactions on Consumer Electronics, vol. CE-30, No. 4, Nov. 1984, pp. 519–527.
CA3224E, Linear Integrated Circuits, Automatic Picture Tube Bias Circuit, File No. 1553, pp. 1–9.

*Primary Examiner*—Victor R. Kostak
*Assistant Examiner*—Nathan J. Flynn
*Attorney, Agent, or Firm*—Joseph S. Tripoli; Peter M. Emanuel

[57] ABSTRACT

An automatic kinescope bias (AKB) arrangement embodied in an integrated circuit (IC) includes circuitry for generating a timing signal during an AKB test interval, circuitry for generating a test signal in response to the timing signal, and circuitry including an output terminal for coupling the test signal to the kinescope. The AKB IC also includes an input terminal and a switching element coupled between the input terminal and the output terminal and responsive to the timing signal for selectively decoupling the input terminal from the output terminal. In a television system which includes a bias network which is coupled to the output of the video signal source and which inhibits the kinescope from being cutoff during the AKB test interval, the input terminal of the AKB IC is coupled to the output terminal of the video signal source. This allows the bias network to be decoupled from the display device during the AKB test interval, thereby preventing the bias network from affecting AKB operation. Alternatively, in a television system which does not include a bias network which inhibits the kinescope from being cutoff during the AKB test interval, the output terminal of the AKB IC is directly coupled to the output terminal of the video signal source.

10 Claims, 2 Drawing Sheets

AUTOMATIC KINESCOPE BIAS ARRANGEMENT

FIELD OF THE INVENTION

The invention concerns an automatic kinescope bias (AKB) arrangement for use in a television system such as a television receiver or video monitor.

BACKGROUND OF THE INVENTION

An AKB system compensates for changes in the cutoff voltage of a kinescope (or cathode ray tube) due to temperature, for example, during warm-up, and aging. The compensation is accomplished by inserting small offset currents into the kinescope driver circuits of each of the color channels to effectively change the respective cathode bias voltages. The magnitudes of the offset currents are varied according to cutoff measurements made during respective lines of the vertical blanking period of every field.

It is desirable to provide an AKB arrangement which may be embodied in an integrated circuit (IC), and which may be capable of being used in various television systems having different configurations. It is also desirable that such AKB IC be capable of being added as an optional feature to a television system without significant changes to its basic architecture. More specifically, it is desirable to provide an AKB IC which is capable of being used in a television system which includes a bias network which affects the kinescope bias from being cutoff while the AKB measurements are being made, as well as in a television system which does not contain such a bias network.

SUMMARY OF THE INVENTION

An aspect of the invention concerns an AKB IC, for use in a television system including a source of a video signal, a display device such as a kinescope, means for amplifying the video signal to produce an amplified version of the video signal and means for coupling the amplified version of the video signal to the display device. The AKB IC includes means for generating a timing signal during an AKB test interval, means for generating a test signal in response to the timing signal, and means including an output terminal for coupling the test signal to the display device. In accordance with an aspect of the invention, the AKB IC also includes an input terminal and a switching element coupled between the input terminal and the output terminal and responsive to the timing signal for selectively decoupling the input terminal from the output terminal. In a television system which includes a bias network which is coupled to the output of the video signal source and which affects the kinescope bias during the AKB test interval, the input terminal of the AKB IC is coupled to the output terminal of the video signal source. This allows the bias network to be decoupled from the display device during the AKB test interval, thereby preventing the bias network from affecting AKB operation. Alternatively, in a television system which does not include a bias network which affects the kinescope bias during the AKB test interval, the output terminal of the AKB IC is directly coupled to the output terminal of the video signal source.

These and other aspects of the invention will be described with reference to the preferred embodiment of the invention shown in the accompanying Drawing.

BRIEF DESCRIPTION OF THE DRAWING

In the Drawing.

In the two figures, corresponding elements are identified by the same or similar reference designations.

DETAILED DESCRIPTION OF THE DRAWING

Figure 1:
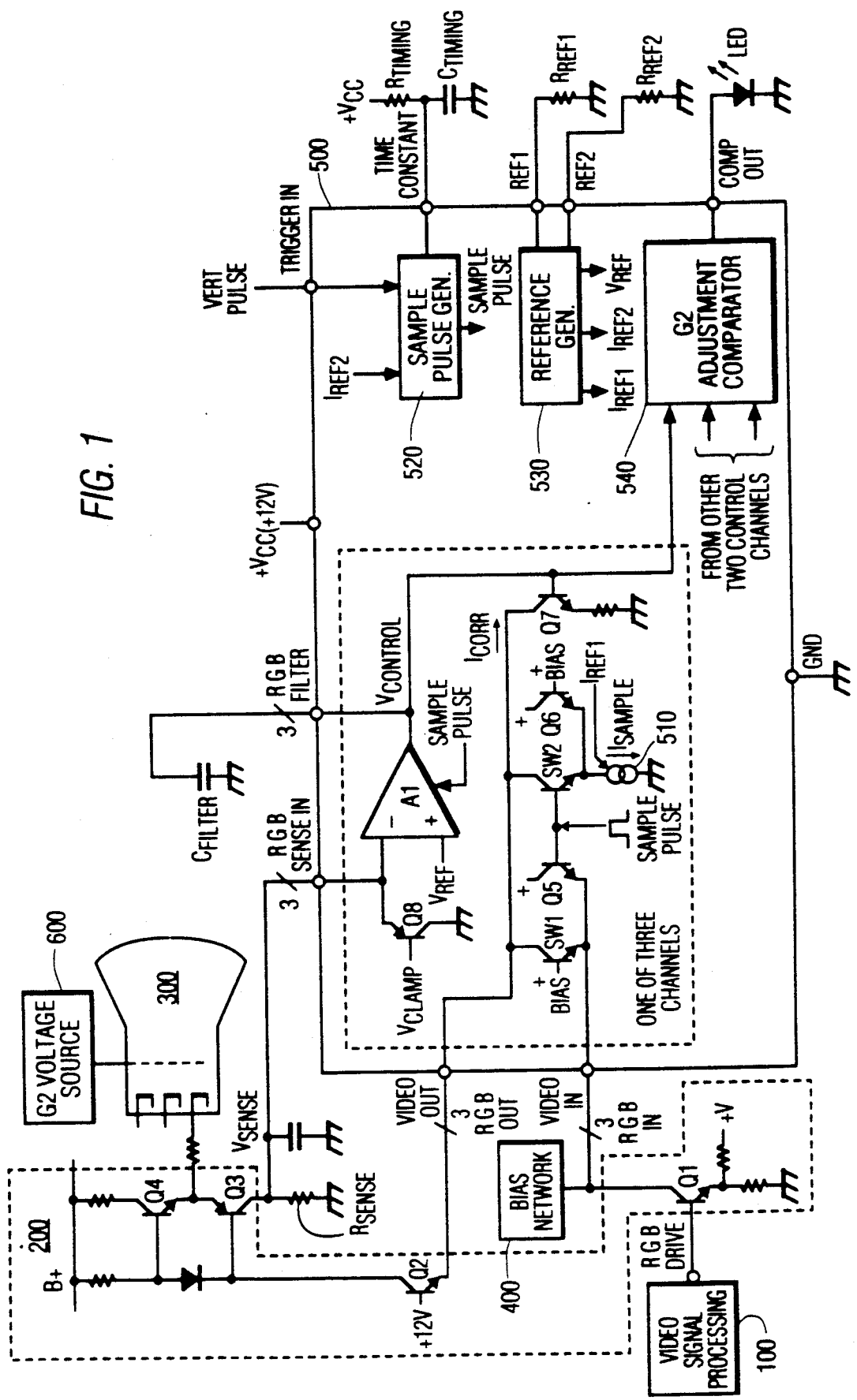
FIG. 1 is a schematic diagram of a portion of a television system employing an AKB IC constructed according to the present invention.

FIG. 1 shows a block diagram for the kinescope drive portion of a television system and a circuit implementation of an AKB IC constructed according to the present invention. Only the red (R) color channel of the red (R), green (G) and (B) color channels is shown for simplicity. However, the use of the same arrangement for each of the three color channels is represented in FIG. 1 by the designation "R G, B" and the indication of "3" conductors at various places. Accordingly, it will understood that each of the green and blue channels include portions similar to the portion of an AKB IC 500 of the red channel enclosed within the dotted lines. The arrangement is first described assuming that an AKB IC 500 is not present and that the collector of a transistor Q1 is directly connected to the emitter of a transistor Q2.

A video signal processing IC 100 provides the red (R), green (G) and blue (B) color video signals. The red video signal is coupled to a kinescope driver 200 comprising cascode connected transistors Q1 and Q2 and "push-pull" connected transistors Q3 and Q4. An amplified version of the red video signal provided by kinescope driver 200 is coupled to the "red" cathode of a kinescope 300. A bias network 400 for supplying a bias voltage to kinescope 300 is coupled to the collector of transistor Q1, and through transistors Q2 and Q3 to the red cathode of kinescope 300. The purpose of bias network 400 is to allow the adjustment of low brightness color temperature (or color balance) by controlling the collector current of transistor Q1 when the red video signal is set at 0 IRE (black level). With the television system configuration described so far with reference to FIG. 1, kinescope driver 200 is not completely cut-off during the vertical blanking period due to the presence of bias network 400. This makes the addition of an AKB arrangement difficult because the operation of a typical AKB arrangement requires the capability of causing the kinescope to be at or near cutoff. A configuration such as described so far with respect to FIG. 1 is employed in RCA brand name television receivers of the CTC-169 chassis type manufactured by Thomson Consumer Electronics, Indianapolis, Ind., employing a Toshiba TA8680 video signal processing IC.

Figure 2:
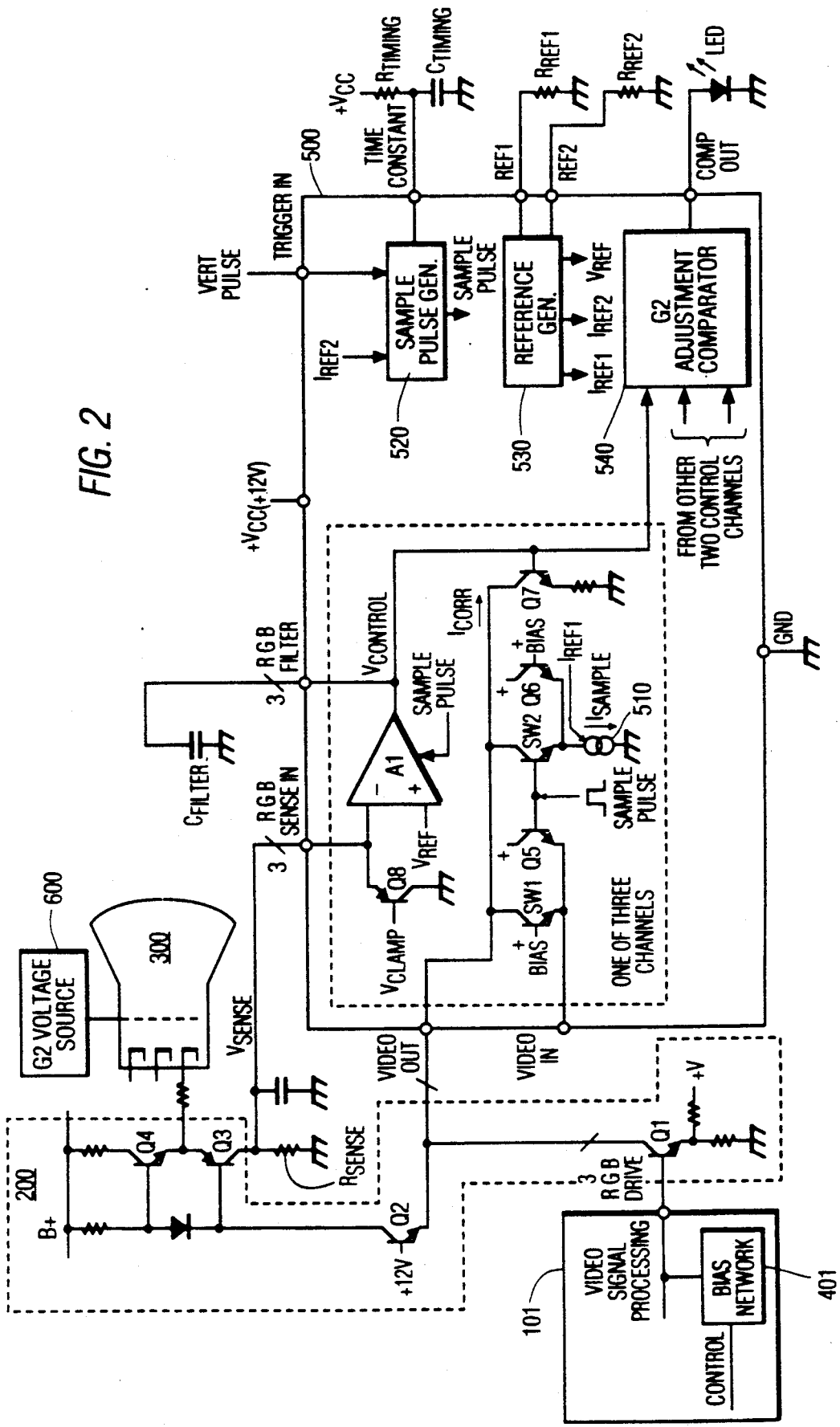
FIG. 2 is a schematic diagram of a portion of a different television system employing the same AKB IC shown in FIG. 1, but connected in a different configuration.

AKB IC 500 includes circuitry for generating a test current sample, coupling the test current sample to kinescope driver 200, sensing the response to the test current at the red cathode of kinescope 300, and generating a bias correction current during an AKB interval. According to an aspect of the invention, AKB IC 500 also includes circuitry for decoupling bias network 400 from kinescope 300 during the AKB interval so that bias network 400 does not interfere with the AKB operation. As a result. complex external circuitry for decoupling bias network 400 from kinescope 300 or otherwise disabling its operation during the AKB interval is not required. In addition, AKB IC 500 is arranged so that it may also be used in a television system, such as shown in FIG. 2, in which does not include a bias network which interferes with the AKB operation.

In the configuration actually shown in FIG. 1, a transistor switch SW1 of AKB IC 500 is connected between the collector of transistor Q1 and the emitter of transistor Q2 via a video input terminal (VIDEO IN) and a video output terminal (VIDEO OUT), respectively. Another transistor switch SW2 is connected between a source 510 of a current $I_{SAMPLE}$ and the video output terminal. Normally, transistor switch SW1 is conductive (closed) and transistor switch SW2 is non-conductive (opened). As a result, the collector of transistor Q1 is coupled (connected) to the emitter of transistor Q2 and bias network 400 is coupled to kinescope 300, and current source 510 is decoupled from kinescope driver 200.

Vertical blanking pulses, derived by the vertical deflection portion (not shown) of the television system, are coupled to a sample pulse generator 520 via an input terminal (TRIGGER IN) of AKB IC 500. During the last portion of each vertical blanking period, for example, during line 20, a sample pulse is generated by sample pulse generator 520 and coupled via emitter-follower configured transistors Q5 and Q6 to transistor switches SW1 and SW2, respectfully. In response, transistor switch SW1 is rendered non-conductive (opened) and transistor switch SW2 is rendered conductive (closed). As a result of the non-conductive state of transistor switch SW1, the collector of Q1 and bias network 400 is decoupled from the emitter of transistor Q2 and from kinescope 300 causing kinescope driver 200 to be cutoff. As a result of the conductive state of transistor switch SW2, current sample $I_{SAMPLE}$ is coupled via the video output terminal to kinescope driver 200 causing a fixed amplitude negative pulse corresponding to current $I_{SAMPLE}$ to be impressed on the red cathode of kinescope 300.

Also during this period, a comparator A1, having an inverting (−) input coupled to a sensing resistor $R_{SENSE}$ connected to the collector of transistor Q3 of kinescope driver 200 via an input terminal (SENSE IN), is enabled in response to the sample pulse. Resistor $R_{SENSE}$ converts the kinescope cathode current produced in response to sample current $I_{SAMPLE}$ to a corresponding voltage $V_{SENSE}$. An external filter capacitor $C_{FILTER}$, coupled to the output of comparator A1 by an output terminal (FILTER), will be charged or discharged depending on relationship between sensed voltage $V_{SENSE}$ coupled to the inverting (−) input of comparator A1 and a reference voltage $V_{REF}$ coupled to a non-inverting (+) input of comparator A1. Reference voltage $V_{REF}$ is generated by a reference voltage generator 530. A control voltage $V_{CONTROL}$ developed across filter capacitor $C_{FILTER}$ coupled to the output of comparator A1 via a terminal FILTER is converted to a corresponding bias correction current $I_{CORR}$ by a current source configured transistor Q7. Bias correction current $I_{CORR}$ is coupled to the emitter of transistor Q2 of kinescope driver 200 via video output terminal VIDEO OUT to correct the red cutoff bias voltage of kinescope 300. For example, if sensed voltage $V_{SENSE}$ is lower than reference voltage $V_{REF}$, control voltage $V_{CONTROL}$ will increase. The higher control voltage $V_{CONTROL}$ will cause correction current $I_{CORR}$ to increase. This lowers the voltage at the red cathode and causes the red beam current to increase. This process continues until sensed voltage $V_{CONTROL}$ remains constant. As the red cutoff voltage of kinescope 300 changes due to temperature, for example, during warm up, or aging, bias correction current $I_{CORR}$ will be varied to maintain a constant beam current during the AKB sampling interval.

A clamping arrangement comprising a transistor Q8 is coupled to the SENSE IN terminal of AKB IC 500 to clamp voltage $V_{SENSE}$ coupled to the inverting (−) input of comparator A1 to a voltage $V_{CLAMP}$. The voltage clamping arrangement prevents voltage $V_{SENSE}$ developed during the image scanning interval in response to the red video signal from exceeding a level which might damage AKB IC 500.

As earlier noted, AKB IC 500 includes a sample pulse generator 520 which is used to control timing for the cutoff measurement, and specifically, controls the the generation of the sample pulse. The operation of sample pulse generator 520 involves two time constants. The first determines the delay of the sample pulse after the vertical blanking pulse trigger signal is received. The second determines the duration of the sampling pulse. An external timing network, including a resistor $R_{TIMING}$ and a capacitor $C_{TIMING}$, is coupled to sample pulse generator 520 via a terminal (TIME CONSTANT). Capacitor $C_{TIMING}$ affects both the pulse delay and duration, while resistor $R_{TIMING}$ primarily affects the pulse duration.

Reference voltage generator 530, which provides reference voltage $V_{REF}$, also provides two reference currents, $I_{REF1}$ and $I_{REF2}$ in conjunction with respective external precision resistors $R_{REF1}$ and $R_{REF2}$. These precision resistors are coupled to reference voltage generator 530 via respective terminals REF1 and REF2. Reference current $I_{REF1}$ is used by current source 510 to generate sample current $I_{SAMPLE}$. Reference current $I_{REF2}$ is used by sample pulse generator 520 to determine the duration of the sample pulse.

An AKB arrangement should desirably also include provisions for adjustment of the G2 grid voltage of the kinescope since the AKB arrangement will tend to "compensate" for G2 changes by adjusting the cathode bias condition for red, green and blue, resulting in non-optimum drive conditions. With this in mind. AKB IC 500 includes a voltage comparator 540 for providing an indication that AKB control voltage $V_{CONTROL}$ is at some nominal level in its operating range. G2 adjustment comparator 540 monitors the three (red, green and blue) $V_{CONTROL}$ voltages and generates an output current when the highest of the three exceeds a predetermined voltage. The output current output is provided at an output terminal (COMP OUT). As shown in FIG. 1, the current output of comparator 540 may be coupled to an external light emitting diode (LED) for providing visual feedback to the person performing the adjustment. The current output of comparator 540 may also be coupled to a microprocessor, which is used to control various functions of the television system, in order to provide an "on-screen" visual feedback indication. G2 voltage adjustment is accomplished by varying the G2 grid voltage provided by a G2 voltage source 600 until the output of G2 adjustment comparator 540 just changes state. Alternately, the output of G2 adjustment comparator 540 may be utilized in an automatic G2 voltage alignment arrangement, thereby eliminating the necessity for a manual adjustment.

FIG. 2 shows the application AKB IC 500 in a television system in which kinescope driver 200 and kinescope 300 are completely cut-off during the vertical blanking period. The latter is accomplished by causing each of the color video signals to be driven to ground potential in response to a control signal communicated to a bias network 401 included video signal processing IC 101, for example, via a data bus. In the television shown in FIG. 2, the the collector of transistor Q1 of kinescope driver 200 is directly coupled to the emitter of transistor Q2, rather than through switch SW1 of AKB IC 500. The video output terminal (VIDEO OUT) of AKB IC 500 is directly connected to the junction between the collector of transistor Q1 and the emitter of transistor Q2. Switch SW1 plays no part in the AKB operation. In all other respects, the AKB arrangement and its operation are the same as those for the AKB arrangement shown in FIG. 1.

Kinescope driver 200, or a significant portion of it, is usually incorporated on a single printed circuit board, commonly referred to in the television field as the "kinescope driver board". AKB IC 500 can be advantageously incorporated on the kinescope driver board since it only requires connection to kinescope driver 200, and not to any other portion of the video signal processing channel.

We claim:

1. A television system comprising:
   a display device;
   a source of a video signal;
   means for amplifying said video signal to produce an amplified version of said video signal; said amplifying means including an input portion coupled to said source and an output portion coupled to said display device;
   means for providing a bias signal for said display device coupled to said input portion of said amplifying means; and
   an integrated circuit including an input terminal coupled to said input portion of said amplifying means; an output terminal coupled to said output portion of said amplifying means; a sense terminal coupled to said output portion of said amplifying means; means for generating a timing signal during a test interval; means for generating a test signal in response to said timing signal; means coupled to said output terminal for coupling said test signal to said display device via said output portion of said amplifying means; means coupled to said sense terminal for generating a correction signal in response to said test signal; means coupled to said output terminal for coupling said correction signal to said display device via said output portion of said amplifying means; and a switching element coupled between said input and output terminals for selectively decoupling said input and output portions of said amplifying means and thereby decoupling said bias signal from said display device in response to said timing signal.

2. For use in a television system including a source of a video signal, a display device, means for amplifying said video signal to produce an amplified version of said video signal, and means for coupling said amplified version of said video signal to said display device, an integrated circuit comprising:
   an input terminal;
   an output terminal;
   a sense terminal;
   means for generating a timing signal during a test interval;
   means for generating a test signal in response to said timing signal;
   means coupled to said output terminal for coupling said test signal to said display device via said output terminal;
   means coupled to said sense terminal for generating a correction signal in response to a sensed signal generated by said amplifying means in response to said test signal and received from said amplifying means via said sense terminal;
   means coupled said output terminal for coupling said correction signal to said display device via said output terminal; and
   a switching element coupled between said input terminal and said output terminal and responsive to said timing signal for allowing said video signal to be coupled to said means for amplifying via said input terminal, said switching element and said output terminal.

3. A television system comprising:
   a display device;
   a source of a video signal;
   means for amplifying said video signal to produce an amplified version of said video signal suitable for direct application to said display device; said amplifying means including an input portion coupled to said source and an output portion coupled to said display device: and
   an integrated circuit including an output terminal coupled to a point between said input and output portions of said amplifying means; means for generating a timing signal during a test interval; means for generating a test signal in response to said timing signal; means coupled to said output terminal for coupling said test signal to said display device via said output portion of said amplifying means, but not via said input portion of said amplifying means; means coupled to said sense terminal for generating a correction signal in response to a sensed signal generated by said amplifying means in response to said test signal and received from said amplifying means via said sense terminal; and means coupled to said output terminal for coupling said correction signal to said to said display device via said output portion of said amplifying means, but not via said input portion of said amplifying means.

4. The television system recited in claim 1, wherein:
said amplifying means comprises a cascode amplifier including a first transistor comprising said input portion and a second transistor comprising said output portion.

5. The television system recited in claim 2, wherein:
said amplifying means comprises a cascode amplifier including a first transistor comprising said input portion and a second transistor comprising said output portion.

6. The television system recited in claim 1, wherein:
said amplifying means comprises a cascode amplifier including a first transistor comprising said input portion and a second transistor comprising said output portion.

7. A television system comprising:
   a display device;
   a source of a video signal;

means for amplifying said video signal to produce an amplified version of said video signal; said amplifying means including an input portion coupled to said source and an output portion coupled to said display device;

means for providing a bias signal for said display device coupled to a point between said input and output portions of said amplifying means;

means for generating a timing signal during a test interval;

means for generating a test signal in response to said timing signal;

means for coupling said test signal to said display device;

means coupled to said output portion of said amplifying means for generating a correction signal in response to said test signal;

means for coupling said correction signal to said display device via said output portion of said amplifying means; and means coupled to said means for providing said bias signal for selectively decoupling said bias signal from said display device in response to said timing signal.

8. The television system recited in claim 7, wherein:
said means for selectively decoupling said bias signal from said display device includes a switching element coupled between said means for providing said bias signal and said output portion of said amplifying means for selectively decoupling said means for providing said bias signal from said output portion of said amplifying means and thereby decoupling said bias signal from said display device.

9. The television system recited in claim 8, wherein:
said amplifying means comprises a cascode amplifier including a first transistor comprising said input portion and a second transistor comprising said output portion.

10. A television system comprising:
a display device;
a source of a video signal;
means for amplifying said video signal to produce an amplified version of said video signal suitable for direct application to said display device; said amplifying means including an input portion coupled to said source and an output portion coupled to said display device;

means for generating a timing signal during a test interval;

means for generating a test signal in response to said timing signal;

means coupled to a point between said first and said second portions of said amplifying means for coupling said test signal to said display device via said output portion of said amplifying means, but not via said input portion of said amplifying means;

means coupled to said second portion of said amplifying means for generating a correction signal in response to said test signal; and means coupled to said point between said input and output portions of said amplifying means for coupling said correction signal to said display device via said output portion of said amplifying means, but not via said input portion of said amplifying means.

* * * * *